(12) United States Patent
Tremblay et al.

(10) Patent No.: US 9,834,128 B2
(45) Date of Patent: Dec. 5, 2017

(54) TANK TRAILER OPERATING SYSTEM

(71) Applicant: TREMCAR INC., Saint-Jean-sur-Richelieu (CA)

(72) Inventors: Daniel Tremblay, Saint-Jean-sur-Richelieu (CA); Pierre-Luc Beaudette, Saint-Basile-le-Grand (CA); Alexandre Laforest, Laval (CA)

(73) Assignee: TREMCAR INC., Saint-Jean-sur-Richelieu, QC (CA)

( * ) Notice: Subject to any disclaimer, the term of this patent is extended or adjusted under 35 U.S.C. 154(b) by 214 days.

(21) Appl. No.: 14/694,592

(22) Filed: Apr. 23, 2015

(65) Prior Publication Data
US 2015/0307013 A1 Oct. 29, 2015

Related U.S. Application Data

(60) Provisional application No. 61/983,090, filed on Apr. 23, 2014.

(51) Int. Cl.
*B60P 3/22* (2006.01)

(52) U.S. Cl.
CPC ............. *B60P 3/2205* (2013.01); *B60P 3/228* (2013.01); *B60P 3/2255* (2013.01)

(58) Field of Classification Search
CPC ........ B60P 3/2205; B60P 3/2255; B60P 3/228
USPC ...... 280/837; 134/58 R, 169 R, 169 C, 22 R, 134/94, 95, 102, 99, 166 R, 171, 10, 26, 134/29, 34; 210/63; 259/4
See application file for complete search history.

(56) References Cited

U.S. PATENT DOCUMENTS

| | | | |
|---|---|---|---|
| 1,859,479 A | 5/1932 | Thwaits | |
| 2,826,421 A * | 3/1958 | Mueller | B60P 3/2225 220/817 |
| 2,909,186 A | 10/1959 | Larson | |
| 3,072,284 A | 1/1963 | Luhman | |
| 3,117,584 A | 1/1964 | Elenbaas | |
| 3,128,899 A | 4/1964 | Runo | |
| 3,188,238 A * | 6/1965 | Lyon | B08B 9/093 134/102.2 |
| 3,358,009 A | 12/1967 | Omietanski et al. | |
| 3,860,018 A | 1/1975 | Reiter | |

(Continued)

FOREIGN PATENT DOCUMENTS

| | | |
|---|---|---|
| EP | 1125865 | 8/2001 |
| EP | 1232906 | 8/2002 |

(Continued)

*Primary Examiner* — Jacob Knutson
(74) *Attorney, Agent, or Firm* — Baker & Hostetler LLP (57) ABSTRACT

A ground-level access operating system for a tank trailer. The ground-level system includes a cleaning/washing device, a venting device, an inspection access port, and device for loading/unloading the compartments. All devices in this system are located on the side of the semi-trailer, within an operator's reach on the ground. The devices locations are meant to be reachable to ensure operator safety. The operator of the trailer can execute all work without having to reach the top of the tank. Both of venting and cleaning/washing devices have their access port on top of the tank but are hooked up at a position proximate ground level, for an easy-to-reach operation and inspection by on operator on the ground.

19 Claims, 12 Drawing Sheets

(56) References Cited

U.S. PATENT DOCUMENTS

| | | | |
|---|---|---|---|
| 4,079,760 A * | 3/1978 | Hurst | B61D 5/02 |
| | | | 137/575 |
| 4,127,216 A | 11/1978 | Martin, Jr. et al. | |
| 4,315,579 A | 2/1982 | Martin, Jr. | |
| 4,407,315 A | 10/1983 | Haberer | |
| 4,695,186 A * | 9/1987 | King | E01C 23/06 |
| | | | 126/343.5 A |
| 5,348,179 A | 9/1994 | Walker | |
| 5,516,370 A * | 5/1996 | Karnauchow | F02M 65/007 |
| | | | 123/198 A |
| 6,375,222 B1 * | 4/2002 | Wade | B60P 3/2205 |
| | | | 220/562 |
| 6,866,050 B2 * | 3/2005 | Engle | A01J 7/00 |
| | | | 134/116 |
| 7,140,211 B2 | 11/2006 | Tremblay | |

FOREIGN PATENT DOCUMENTS

| | | |
|---|---|---|
| EP | 1447269 | 8/2004 |
| EP | 1806299 | 7/2007 |

* cited by examiner

TANK TRAILER OPERATING SYSTEM

FIELD OF THE INVENTION

The present invention generally relates to tank trailers and more particularly to an improved assembly and arrangement/location of a tank trailer operating system, which would allow an operator to execute operations at ground level, in order to avoid any « top of tank » operations and to avoid accessing the top of the tank trailer.

BACKGROUND

Non-code tank trailers are generally used in the transport industry for the general transportation of liquid products. In the context of the present invention, it relates particularly, but not exclusively, to a stainless steel tank mounted on at least one axle. The tank can include at least one compartment. The tank can also be made of aluminum or steel. The tank can include an assembly shell and heads (2 or more, depends on the number of compartments). The tank can either be: cylindrical, elliptical or conical.

For practical matters, tanker trailers generally have access ports that are all located on top of the barrel. These ports, called manholes, either serve for inspection, filling look up, and sampling, as principal functions or even to give access to the interior of the tank for any other purpose. A manhole is typically provided for each compartment of the tank. The fact that this port is located on top of the tank, increase the danger to an operator wanting to access the port. Other than access ports, there can be also provided a Clean-In-Place (C.I.P.) system, a venting device and a leveling probe that is usually found next to manhole. These other systems access the inside of the tank through the top of the tank. The venting device is important as it ensures that the tank is operated at a proper designated « operational pressure » during the loading/unloading process. The venting device helps avoid positive or negative deformation (from vacuum or pressurization) of the tank. The Clean-In-Place (C.I.P.) system ensures that all parts that would be or have been, in contact with the contained product, are properly cleaned in order to satisfy applicable regulations. The Clean-In-Place (C.I.P.) system is used a couple of times by the operator on a daily basis. In fact, regulations require that the interior surface and every surface, which might have been in contact with the product, be cleaned and sanitized each time the tank is emptied. For example, the cleaning of a milk tank and accessory devices is a chore that requires 3 to 4 steps to satisfy regulations. This process ensures that there is no stale or old dry milk that has been left in the tank the last time the tank was used. These residues could contaminate the new milk and the carrier can lose a whole batch. The leveling probe either serves as a warning alarm or as a motor shut off device.

Independently of the specific product carried in this particular type of semi-trailer, the industry in general, as well as organizations like the Cargo Tank Risk Management Committee (CTRMC) are now more and more concerned about operator security. These organizations seek to minimize the risks of operator injury when operating tank trailer operating systems. These organizations work with all players involved in tank trailer transportation (carrier, worker, manufacturer, supplier, government) to improve the daily security of workers.

A large part of the security problems with the above-described tank trailers is linked to the location of all the above-mentioned devices on the tank. In prior art tank trailers, a large part of the work done by the operator has to be on top of the tank and thus results in greater risks to operator health and security. In a normal day of work, the operator has to climb to the top of the tank several times.

Several innovations have attempted to increase operator safety. Prior art tank trailers include catwalks and/or anti-slip paper on top of the tank. Improved ladders have also been provided as safety railing became an industry standard. However, even with all of these features that have been added to tank trailers, each time that the operator has to climb to approximately three meters from the ground to reach a top of a tank, a lot of risk still remains.

For all advantages that industry standard configurations in tank trailers can bring to the carrier world, there are also a lot of flaws that come with it. As mentioned before, even though operator security is a big concern, but there are also a lot of collateral disadvantages. Just for example, it costs a lot of money for a carrier to insure its employees. There is also a cost associated with all the security parts added to the semi-trailer. All the devices operated on top of the tank also increase the overall height of the tanker trailer. The overall processing time for a normal day of work can also be improved by finding more practical ways to operate all devices.

Other than the security of the operators, there is also an important point that concerns the security of the contents of the tank. Any sanitary tanker has to have anti-tampering system in place to avoid any malevolence from anything or anybody that could ruin the entire integrity of the contents of the tank. For that matter, every important entry point, that can give any kind of access to the interior of the tank and/or to the product, should be forbidden. Possible openings have to be sealed and/or locked. The anti-tampering system allows the operator to see if any alteration of the product has occurred. On a standard tanker semi-trailer, inspection of several different points is required. Therefore, it takes times to make a good verification of all possible entry points, and the more places one has to look, the more one can miss something.

Prior art patent documents known to the Applicant include U.S. Pat. No. 7,140,211B2, U.S. Pat. No. 4,127,216, U.S. Pat. No. 4,407,315, U.S. Pat. No. 4,315,579, EP 1125865B1, EP 1447269B1, U.S. Pat. No. 2,826,421, EP 1232906B1, U.S. Pat. No. 3,860,018, U.S. Pat. No. 2,909,186, EP 1806299A1, U.S. Pat. No. 3,128,899, U.S. Pat. No. 5,348,179, U.S. Pat. No. 3,072,284, U.S. Pat. No. 3,117,584, U.S. Pat. No. 1,859,479, and U.S. Pat. No. 3,358,009.

Therefore, there is a need, in the non-code tank trailer business, to improve both the security and productivity of the workers. One often forgets that most of the time, workers have to reach the top of the tank under hazardous conditions. Rainy, snowy, and windy days, as well as side of the road emergency stops are all conditions that can be experienced by the operator. Also, physical and mental soreness the driver of a tank trailer experiences after a long shift at the wheel can drastically decrease the driver's capabilities tending to increase the danger associated with a driver navigating and performing tasks to the top of the tank. There is a need for a tank trailer that reduces exposure time to the top of the tank during a normal operational day.

SUMMARY

It is therefore a general object of the present invention to provide an improved tank trailer that addresses at least one of the above-mentioned needs.

An object of the present innovation is to provide a tanker semi-trailer that improves the overall security of the worker, since as mentioned above, a large part of injuries to operators has been caused by working on top of the tank.

Another object to the present invention is to improve the efficiency of operators by providing new ways to integrate, in one or two specific areas, processes related to operation of the tank. In this manner, operational work with the tank trailer can be done in a fraction of the time.

In accordance with these objects, there is therefore provided a system that avoids any related operations on top of tanks. There is no better way for doing this than simply forbidding top of tank access to the operator through a new configuration of components on the tank trailer.

According to the present invention, there is provided a tank trailer comprising:
  a tank;
  at least one sealable manhole positioned on a side of the tank proximate ground level;
  at least one venting system comprising:
    a venting top interface connecting the venting system to a top of the tank;
    a venting outlet positioned proximate the at least one manhole; and
    a venting pipe connecting the venting top interface to the venting outlet; and
  at least one clean-in-place system comprising:
    a clean-in-place top interface connecting the clean-in-place system to the top of the tank;
    a clean-in-place inlet adapted to receive a tank-cleaning substance from a cleaning-substance source;
    a clean-in-place pipe system connecting the clean-in-place top interface to the clean-in-place inlet;
wherein the at least one manhole, the at least one venting outlet and the at least one control valve of the clean-in-place pipe system are housed in a lockable housing.

The clean-in-place pipe system may include a control valve positioned proximate the manhole for controlling flow of the tank-cleaning substance between the inlet and the clean-in-place top interface.

In some embodiments, the tank comprises a plurality of compartments; the tank trailer comprises a corresponding manhole, a corresponding venting system and a corresponding clean-in-place system for each compartment, each clean-in-place system being interconnectable to one another and to a common clean-in-place inlet, and each clean-in-place system being isolatable from one another through operation of respective control valves.

Preferably, each clean-in-place pipe system is further connected to a corresponding venting pipe through a restrictor plate. The restrictor plate may be disposed in a joint connecting the clean-in-place pipe system and the venting pipe. The restrictor plate may also be removably disposed in the joint.

Preferably, the tank is substantially circular or elliptical and the lockable housing is positioned at about a 4 or 8 o'clock position when viewing the tank from the rear. Preferably, the tank trailer may include a manhole door for sealing the manhole. The manhole door may include an alignment system for aligning the manhole door with the manhole during sealing.

Preferably, the lockable housing may include a lockable housing door that may be a bi-folded door.

Preferably, the tank trailer further comprises a sampler system provided on each manhole door. A sampler system may also be provided in a rear piping compartment.

Preferably, the tank trailer further comprises a tank fill detection system positioned in an interior top portion of the tank for detecting a level of filling of the interior of the tank.

Preferably, the tank trailer further comprises a tank empty detection system for detecting an empty level of filling of the interior of the tank to avoid the pump running on air.

Preferably, the tank trailer further comprises a mechanical/electrical system that prevents overfilling or spilling products on each compartment's outlet valve.

Preferably, each compartment further includes a digital thermometer that can record and follow product temperature throughout an entire product batch delivery.

Preferably, the tank trailer further comprises a pressure gauge positioned within the lockable housing and connected to at least one of the venting system and the clean-in-place system, the pressure gauge indicating internal tank pressure and the clean-in place internal pressure.

Preferably, the venting system further includes an anti-wave system including an anti-wave pipe extending from the venting top interface into the tank, and a plurality of holes provided on the anti-wave pipe opening towards the sides of the tank, wherein the plurality of holes are adjacent to the top of the tank.

Preferably, the venting system includes a filter provided at the venting outlet.

Preferably, the tank trailer includes a sensor for sensing an open state of the at least one input-output control valve such that a pump for pumping the product to be hauled by the tank trailer through the compartment housing the at least one control valves is prevented from operating when the sensor senses the open state of the at least one input-output control valve.

Some objects, advantages and other features will become more apparent upon reading the following non-restrictive description of certain optional configurations, given for the purpose of exemplification only, with reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Furthermore, although the present invention may be used for tank trailers for transporting milk, for example, it is understood that it may be used for the transport of other products as well.

In addition, although the optional configurations as illustrated in the accompanying drawings comprise various components and although the optional configurations of the tank trailer as shown may consist of certain geometrical configurations as explained and illustrated herein, not all of these components and geometries are essential and thus should not be taken in their restrictive sense, i.e. should not be taken as to limit the scope of the present disclosure. It is to be understood that other suitable components and cooperations thereinbetween, as well as other suitable geometrical configurations may be used for the tank trailer, and corresponding parts, as briefly explained and as can be easily inferred herefrom, without departing from the scope of the disclosure.

Referring to FIGS. 1 to 6, according to a first embodiment of the present invention, there is shown a tank trailer 10 including a tank 12 and at least one sealable manhole 14 positioned on a side of the tank 10 proximate ground level 16. There is also provided at least one venting system 18 including a venting top interface 20 connecting the venting system 18 to a top 22 of the tank 12, a venting outlet 24 positioned proximate the at least one manhole 14, and a venting pipe 26 connecting the venting top interface 20 to the venting outlet 24.

There is also provided at least one clean-in-place system 30 including a clean-in-place top interface 32 connecting the clean-in-place system 30 to the top 22 of the tank 12, a clean-in-place inlet 34 (better shown in FIG. 2C) adapted to receive a tank-cleaning substance from a cleaning-substance source, and a clean-in-place pipe 36 connecting the clean-in-place top interface 32 to the clean-in-place inlet 34. The clean-in-place pipe system 30 includes a control valve 38 positioned proximate the manhole 14 for controlling flow of the tank-cleaning substance between the inlet 34 and the clean-in-place top interface 32. Optionally, a sensor (not shown) for sensing a open state of the at least one input-output control valve 43 such that a pump (also not shown) for pumping a product to be hauled by the tank trailer 10 through the compartment inlet and outlet control valves 38 is prevented from operating when the sensor senses the open state of the at least one input-output control valve 43.

The at least one manhole 14, the at least one venting outlet 24, and the at least one control valve 38 of the clean-in-place pipe system 30 are housed in a lockable housing 40.

In some embodiments, the tank 12 comprises a plurality of compartments 42, 44, and the tank trailer 10 comprises a corresponding manhole 14, a corresponding venting system 18 and a corresponding clean-in-place system 30 for each compartment 42, 44. Each clean-in-place system 30 is interconnectable to one another and to a common clean-in-place inlet 34 through a common pipe line 45, and each clean-in-place system 30 being isolatable from one another through operation of respective control valves 38.

Figure 4:
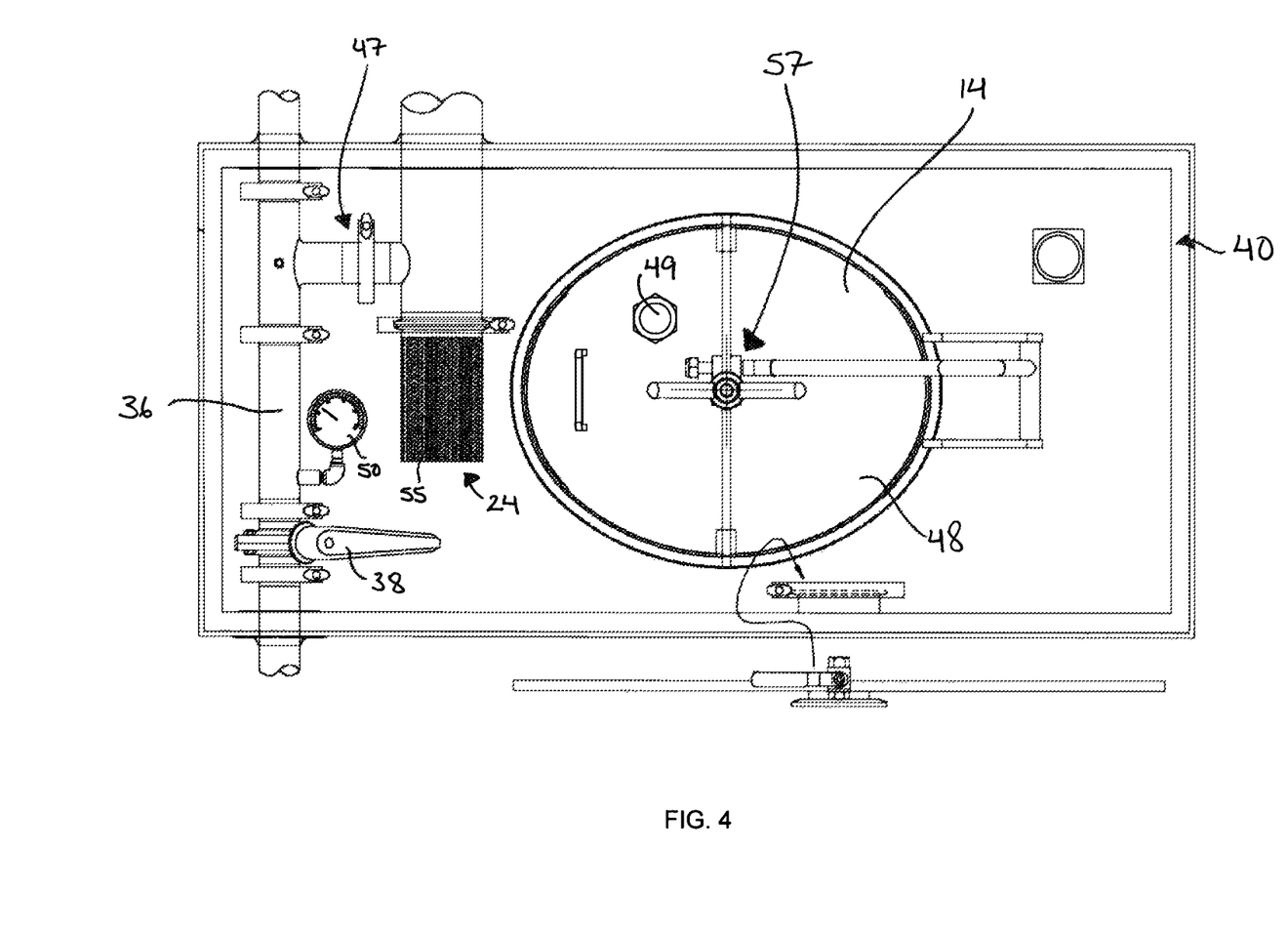
FIG. 4 is a side view of an interior of an access compartment housing of the tank trailer shown in FIG. 1.
Figure 5A:
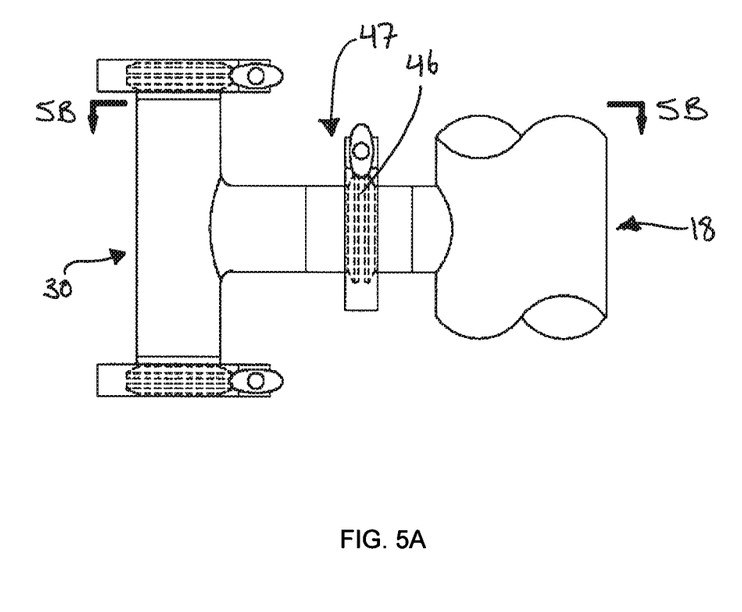
FIG. 5A is an expanded side view of piping in the interior of the access compartment housing of the tank trailer shown in FIG. 4 illustrating a connection joint between the clean-in-place pipe system and the venting pipe.
Figure 5B:
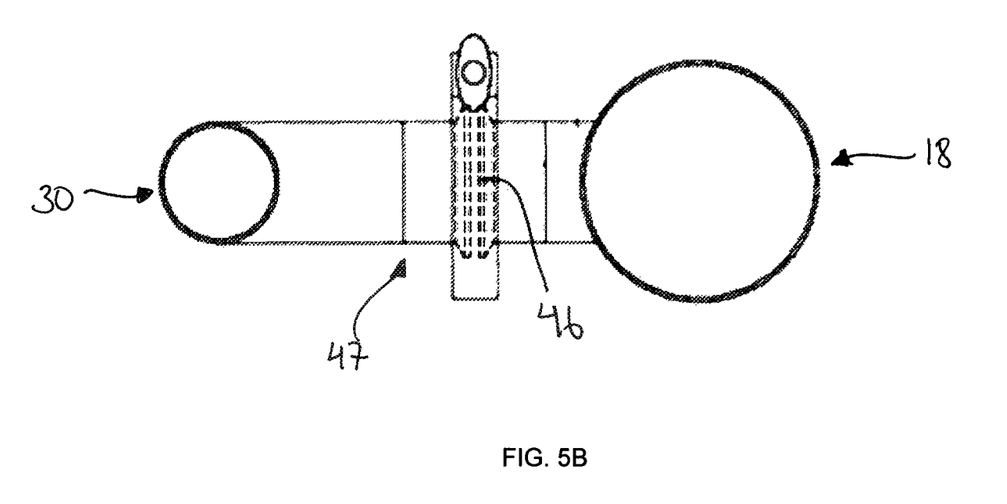
FIG. 5B is a top view of piping in the interior of the access compartment housing of the tank trailer shown in FIG. 4, taken along the line 5B-5B, illustrating a connection joint between the clean-in-place pipe system and the venting pipe.
Figure 5C:
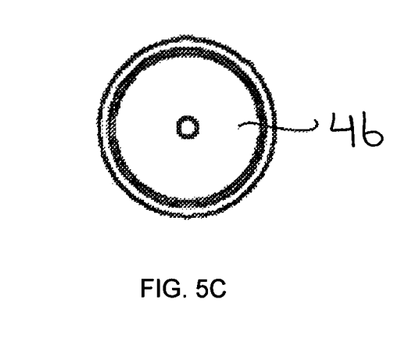
FIG. 5C is a front view of a restrictor, in accordance with an embodiment.
Figure 6:
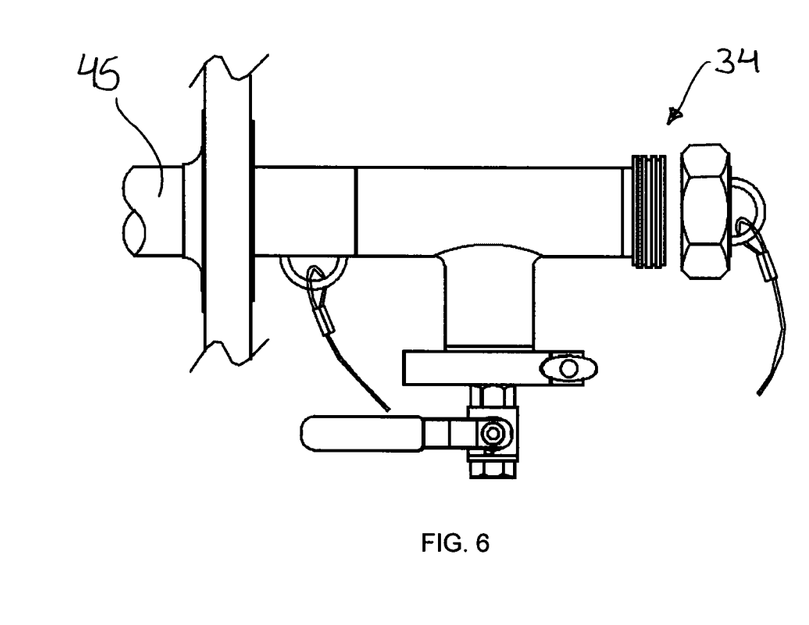
FIG. 6 is a side view of an inlet of the clean-in-place system of the tank trailer shown in FIG. 1.

Preferably, as better shown in FIG. 4 and FIG. 5A, each clean-in-place pipe system 30 is further connected to a corresponding venting pipe 26 through a restrictor plate 46. The restrictor plate 46 is optionally grooved in the clamp connection joint 47 and can be changed and cleaned as required.

Figure 1:
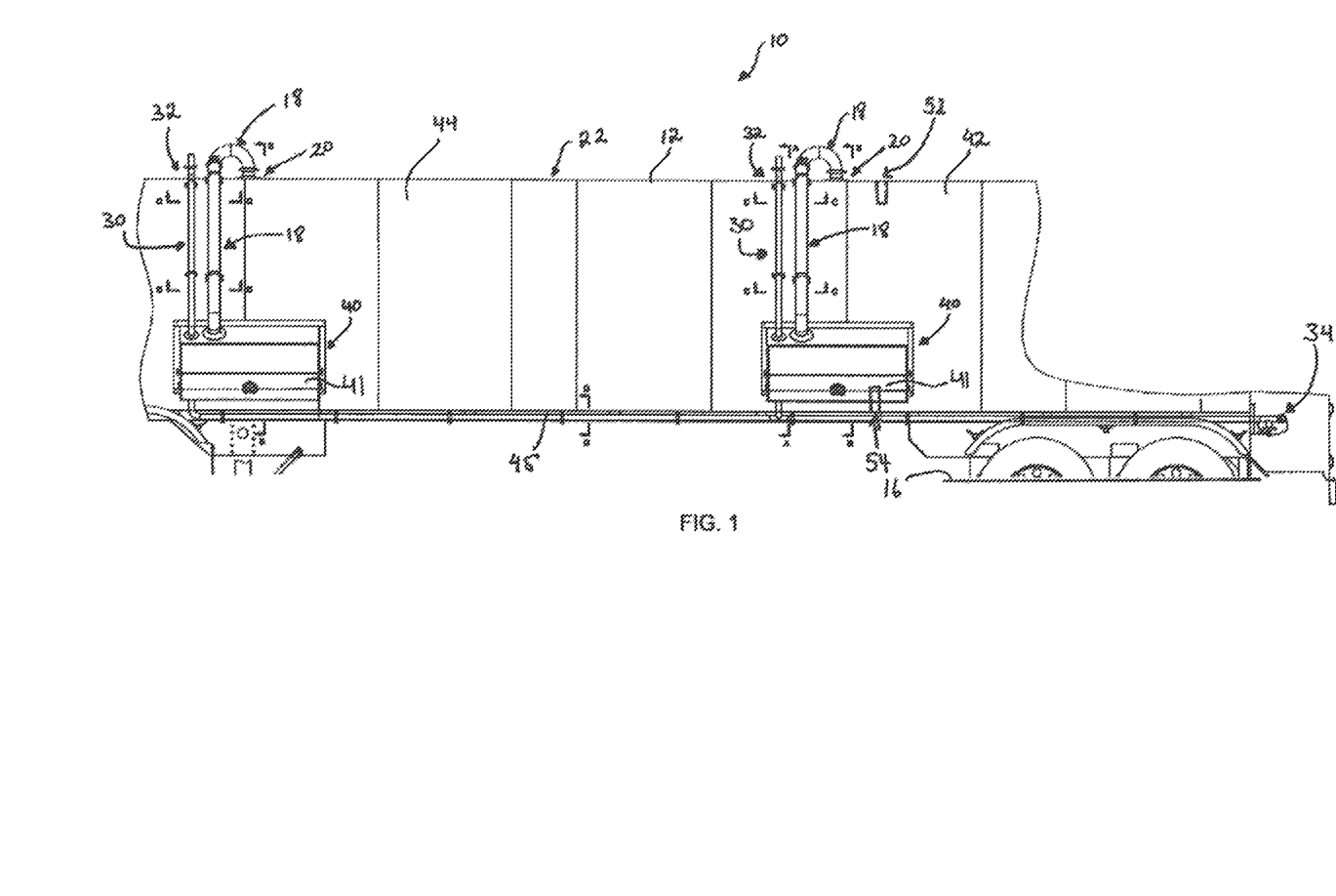
FIG. 1 is a partial side view of a tank trailer, in accordance with a first embodiment of the present invention.
Figure 2A:
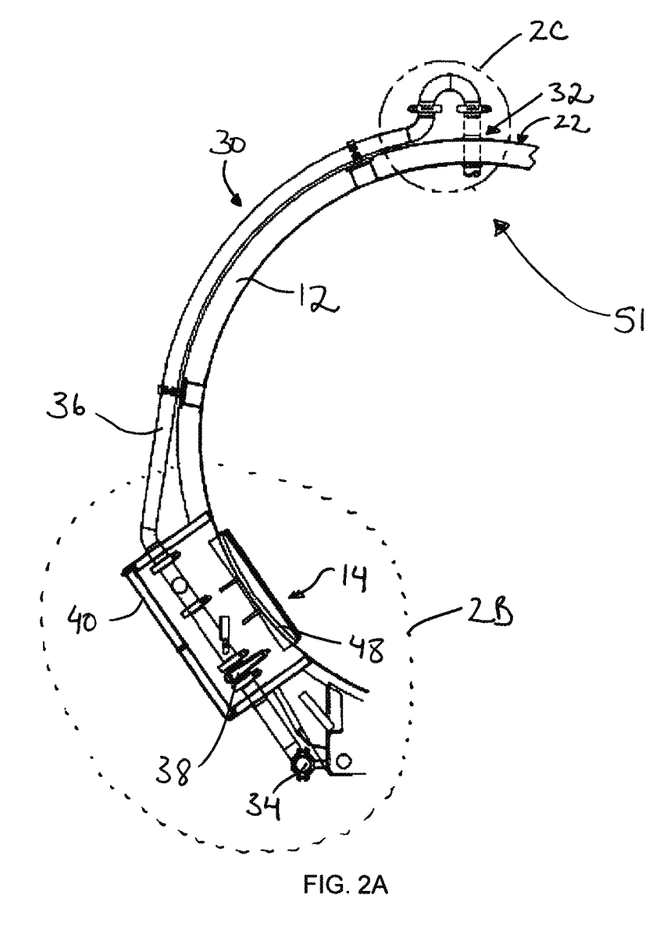
FIG. 2A is cross-sectional view of a clean-in-place system of the tank trailer shown in FIG. 1, taken along the line A-A.
Figure 2B:
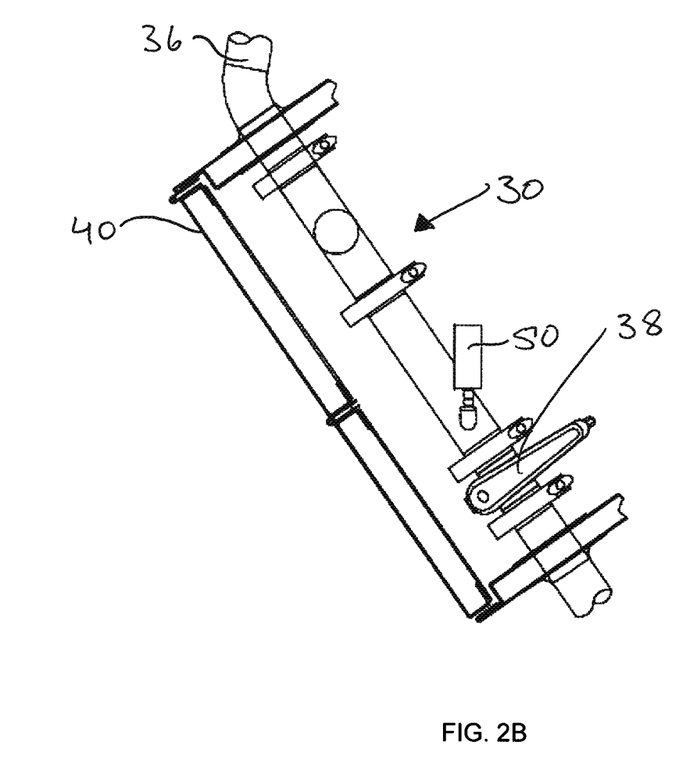
FIG. 2B is a cross-sectional expanded view of a bottom portion of the clean-in-place system shown in FIG. 2A.
Figure 2C:
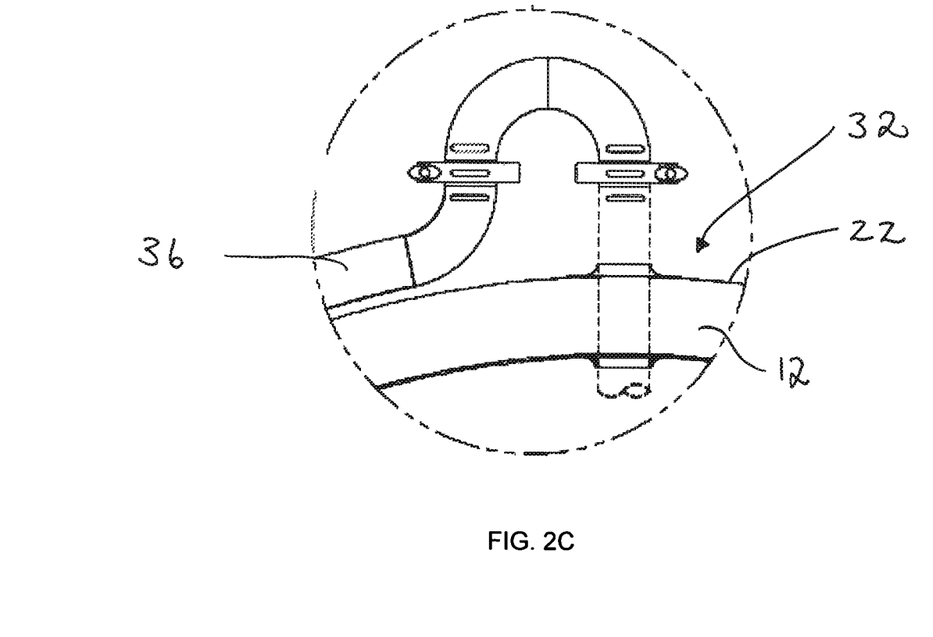
FIG. 2C is a cross-sectional expanded view of the top portion of the clean-in-place system shown in FIG. 2A.
Figure 3A:
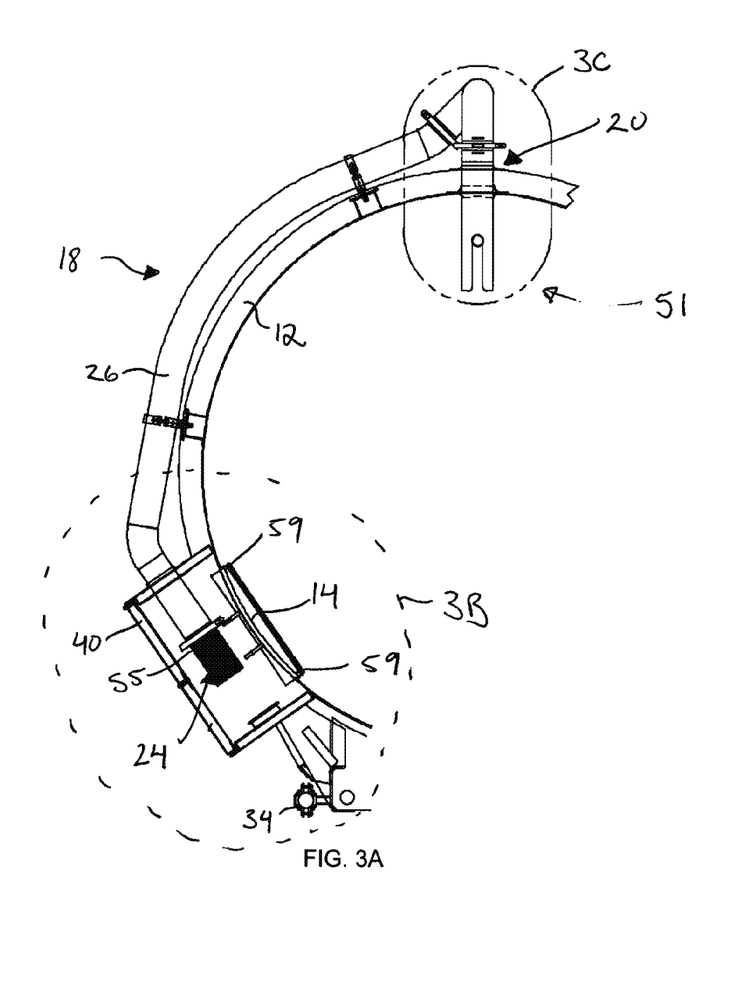
FIG. 3A is a cross-sectional view of a venting system of the tank trailer shown in FIG. 1, taken along the line B-B.
Figure 3B:
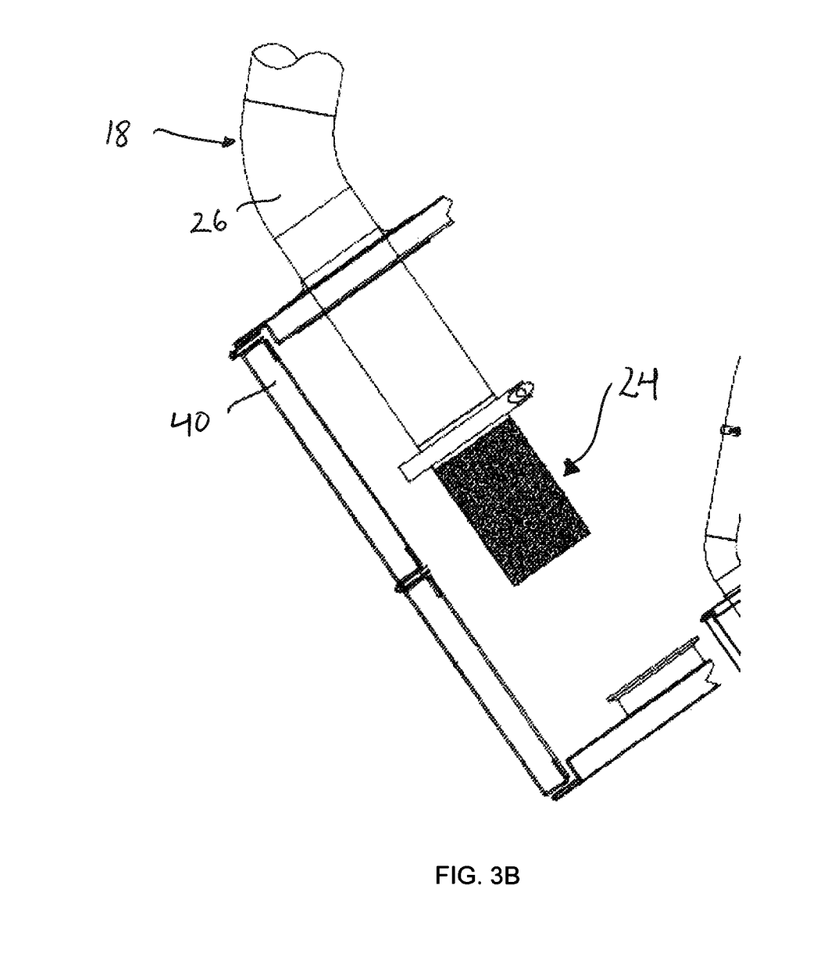
FIG. 3B is a cross-sectional expanded view of the bottom portion of venting system shown in FIG. 3A.
Figure 3C:
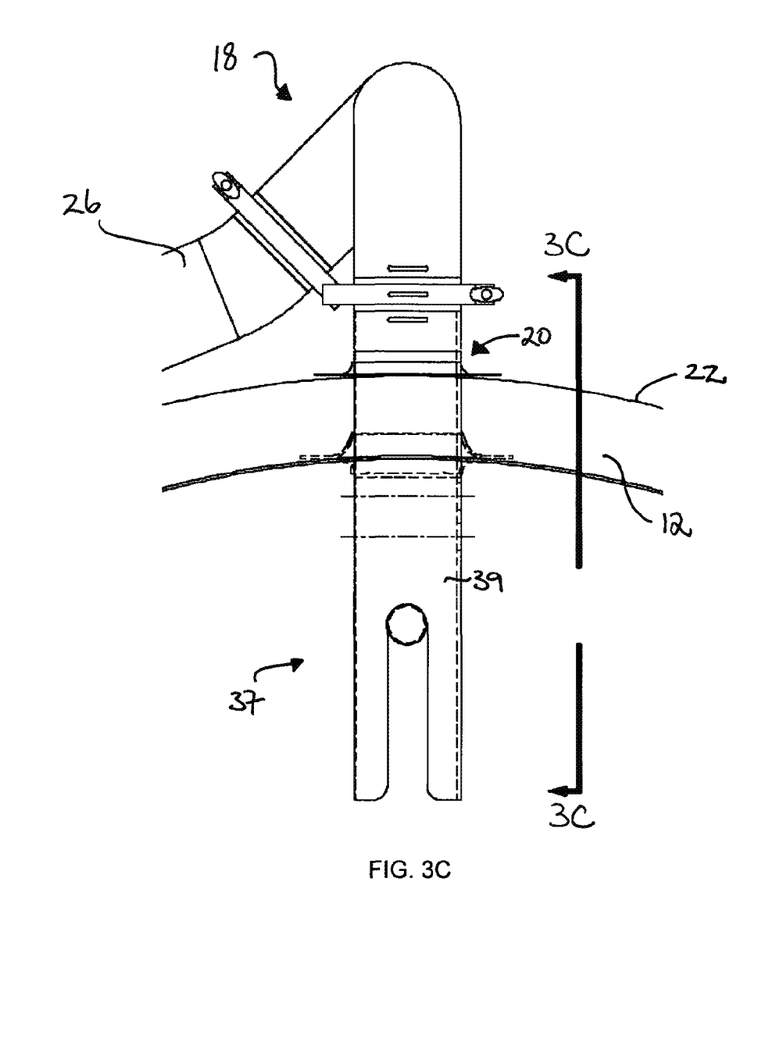
FIG. 3C is a cross-sectional expanded view of the top of venting system shown in FIG. 3A.

Preferably, as better shown in FIGS. 2A and 3A, the tank 12 is substantially circular or elliptical and the lockable housing 40 is illustratively positioned at about a 4 or 8 o'clock position of the sides of the tank 12 when viewing the tank from the rear.

Preferably, as better shown in FIG. 4, the tank trailer 10 further comprises a sampler system 49 provided on each manhole door 48.

Preferably, the tank trailer further comprises a tank fill detection system 52 positioned in an interior top portion 51 of the tank 12 for detecting a level of filling of the interior of the tank 12. Preferably, the tank trailer further comprises a tank empty detection system 54 for detecting an empty level of filling of the interior of the tank.

Preferably, as better shown in FIG. 4, the tank trailer 10 further comprises a pressure gauge 50 positioned within the lockable housing 40 and connected to at least one of the venting system 18 and the clean-in-place system 30, the pressure gauge 50 indicating internal pressure of the tank 12.

Thus, by bringing down all devices that are typically on top 22 on a standard tanker trailer, one avoids having to climb on top of the tank 12.

The new system brings all devices that are usually on top 22, to the side of the tank semi-trailer 10, at operator level near ground-level. The manhole 14 is a compression type manhole 14 and is located at approximately 4 or 8 o'clock (on a transversal view of the tank 12). The C.I.P. (Clean-In-Place) system 30 accesses into the tank 12 by the top 22 end thereof, but a 2" clean-in-place pipe 36 line hook up links the top interface 32 to another location near the manhole 14. The venting system 18 is a 4" stainless steel venting pipe 26 line that also takes its access on top 22 of the tank 12 and runs in parallel to the clean-in-place pipe 36 line and ends up approximately at the same place. Both of clean-in-place pipe 36 and the venting pipe 26 venting lines have a "U bend" that acts to avoid spilling any product from inside the tank 12 to inside the clean-in-place pipe 36 and the venting pipe 26 lines. The venting pipe 26 line includes an extra anti-wave system 37 that prevents such spilling of any product from inside the tank 12 to inside the venting pipe 26 lines.

Figure 3D:
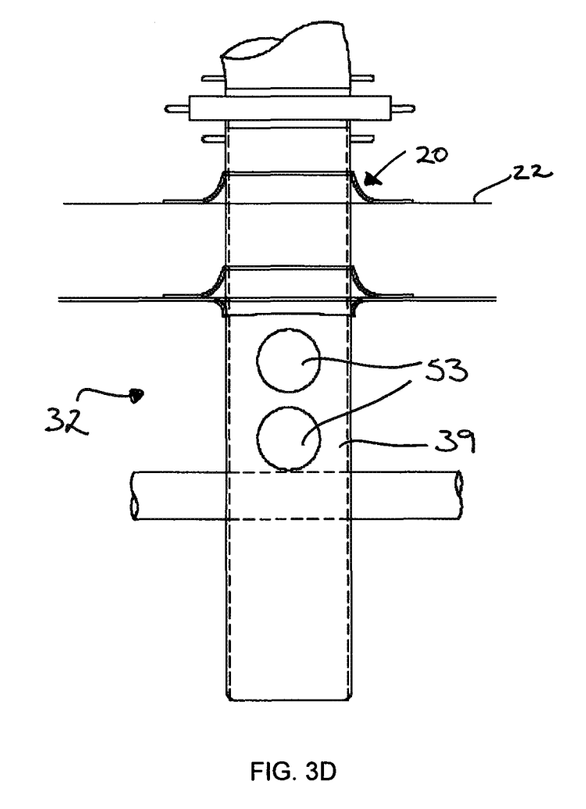
FIG. 3D is a cross-sectional expanded view of the top of venting system shown in FIG. 3A, taken along the line 3C-3C.

The anti-wave system 37 includes an anti-wave pipe 39 illustratively extending approximately 6" inside the tank 12. To ensure proper venting while diminishing the wave effect, 4 holes 53 (2 per side) as illustrated in FIG. 3D are conducted on each side of the anti-wave pipe 39 (pointing curbside and driverside). These holes 53 are situated near the top of the tank 12 on the highest point of the anti-wave pipe 39.

Since the venting pipe 26 line is exposed to atmospheric condition, a stainless steel filter 55 may be added to the venting pipe 26 line to ensure that no dust or insects can enter into the tank 12 through the venting pipe 26 line to alter the product's quality.

Both the clean-in-place pipe 36 and the venting pipe 26 lines are illustratively connected together by the restrictor plate 46 that allows the venting pipe 26 line to be cleaned at the same time as the clean-in-place pipe 36 line. This restrictor plate 46 is grooved in the joint 47 of the clamp and is changeable.

Prior to cleaning, the operator has to remove the filter and cap off of the lines. This cap also ensures that the manhole is open during the process. The mechanical system does not allow the operator to install the cap unless the manhole is open. Once the cleaning process has been initiated, the venting pipe 26 line can be gradually filled with a cleaning solution.

All of the three systems (manhole 14, clean-in-place system 30, venting system 18) are preferably enclosed in a small lockable housing 40 to avoid any tampering. If the tanker 12 includes two compartments, both clean-in-place pipe 36 lines are connected and isolated within the rear housing 40. A valve 38 is integrated to isolate each compartment and therefore give the possibility of cleaning individually each compartment.

To ensure a proper cleaning process, a high temperature chemical solution is used. Even if the chemical composition of the cleaning product itself may not harm the human body if entered into contact therewith, the high temperature of the cleaning product could impart harm to the operator. For this cleaning process to perform adequately without altering the integrity of the tank 12 (for example the cleaning process may create a vacuum when tank 12 cools off after cleaning with the high temperature cleaning product), the operator may be required to open all the provided manholes 14. In an existing tanker configurations, this process does not create a problem, but in the case of the present invention, since the manhole 14 is on the side of the tanker 12 and requires to be opened during the cleaning process, high temperature cleaning solution is able to escape out of the manhole 14 port, which may result in injury to an operator standing next to the manhole 14. The lockable housing 40 further includes a cabinet door 41 which is a bi-folded door design may be provided which allows the operator to close the cabinet door 41 partially which can then function as a shield to shield the operator from any high temperature cleaning solution escaping out of the manhole 14 port.

Since the manhole 14 is a compression type manhole that is used to seal the manhole 14 port, there is risk of improper sealing. The tank 12 manhole 14 seal integrity is ensured by thus providing an alignment system 57 that ensures the inside cap 59 of the manhole 14 will be in the right position to properly seal against the manhole 14 port.

The above-described system allows various operations to be accomplished over the course of a normal work day by an operator, within arms' reach at ground level and includes:
Inspection
Maintenance
Sealing
Loading/Unloading
Cleaning/Washing
Sampling With the above-described design, operations can be carried out similarly as with standard tanker semi-trailers. With respect to inspection and maintenance of the tank 12, with the angle of view that the new manhole 14 position gives, it is a lot easier for an operator to see and access the inside of the tank 12 as opposed to prior art systems. Concerning the sealing function of the lockable housing 40, enclosing and locking all devices that a compartment can have, in one housing, helps avoid losing precious time to seal the various ports with plastic or stainless steel security seals for example and verify these seals at every step of transportation. The number of seals needed is reduced to the number of lockable housings 40 that are on the tank trailer 10, instead of having them on each and every port. By incorporating the venting system 18 at eye and ground level, it is a lot easier to see that the tank 12 remains at atmospheric pressure when loading/unloading and that the tank 12 is not subject to an undue pressure differential. Cleaning/washing operations are also enhanced. By bringing down the vent with a venting pipe 26 line, there may be some product residue inside this piping, but, on the other hand, spilling is contained. Therefore, to ensure hygienic and proper sanitary transportation, the operator has an opportunity to clean every device and piping included on the tank 12 by one inlet port that is located in the rear of the tank 12.

However, bringing down all these devices and systems proximate to ground level 16 also creates some undesired inconveniences. For example, as certain intended initial purposes of the manhole 14 cannot be conducted anymore, one has to find alternate ways to be able to accomplish them. In fact, the new position of the manhole 14 cannot allow the operator to open the tank 12 until the tank 12 is completely emptied. Moreover; leveling the quantity of product in the tank 12 and sampling the product batch can no longer be accomplished in the traditional manner when a manhole is positioned on top 22 of the tank 12. If one cannot monitor how full the tank 12 could be when filling, how can we close the pump/motor (not shown) used to fill or empty the tank 12 at the right time? As a corollary, it is not possible to monitor how empty the tank 12 is before the pump begins to pump air which can damage the pump. In the new system, a sensor probe system (also not shown) is preferably provided on either the top or bottom interior of the tank 12 and will automatically stop the pump/motor when the product contacts it, thus avoiding overfilling the tank 12 or letting the pump run on air when tank 12 is emptied, which may damage the pump.

By bringing down all devices, the operator loses a lot of visual inspection ability. This visual inability can also result in a compartment's overflow if the pump is not properly operated. The probe system can shut down the pump when the compartment is full, but the pump can be restarted anytime. If the operator forgets to close the valve of the filled compartment after the pump is shut, and he restarts the pump, that could result in a large spill and a significant portion of product being lost. A fail-safe mechanical/electrical system (not shown) may be provided to prevent this from happening. If a valve 38 is in "open" position and the pump has been shut down, the open valve is mechanically linked to the pump for ensuring that an electrical circuit remains opened too, to avoid the pump/motor from being started again. This fail-safe mechanical/electrical system ensures that the circuit will remain open until the valve 38 is properly closed.

For sampling operations, one cannot open the manhole 14 anymore and take sample when the tank 12 is full. Preferably, a QMI™ sampler 49 is provided on the manhole 14 door 48. The sampler 49 allows taking individual samples through a sanitary membrane (not shown), as required without altering or tampering the whole product batch in the tank 12.

Also, since there is less access to the product compared to access on a normal tank, a digital temperature recorder (not shown) may be installed in the 8 O'clock lockable housing 40. This will help monitoring the temperature and the product quality.

In summary, the above-described systems offer the following advantages, among others:

Removal of top access to the tank means a reduction in cost and weight of parts that are no longer needed (No more catwalk, safety railing and ladder will be required since no more work on top of the tank will be conducted). It also reduces the drag.

Insurance rates for carriers can be renegotiated since fall risks from the top of the tank have been eliminated.

The system also improves operator work efficiency and productivity.

Improved product delivery or tank filling times.

Decrease in maintenance tasks, durations and costs for tank components.

Improvement in the quality of tank inspections.

Possible increase in the frequency of tank inspections.

Lowers the center of gravity of the tank trailer as less equipment is positioned on top of the tank.

Improved access to the interior of the tank.

Improved exit access if working in a poor oxygen environment.

Improved controlled of the product's environment.

Of course, the scope of the claims should not be limited by the preferred embodiments set forth in the examples, but should be given the broadest interpretation consistent with the description as a whole. Numerous modifications could be made to the above-described embodiments without departing from the scope of the claims, as apparent to a person skilled in the art. Furthermore, it is apparent that this invention can apply to many other uses.

The invention claimed is:

1. A tank trailer comprising:
a tank;
a sealable manhole positioned on a side of the tank proximate ground level;
a manhole door for sealing the manhole;
a sampler system provided on the manhole door;
a venting system comprising:
 a venting top interface connecting the venting system to a top of the tank;
 a venting outlet positioned proximate the manhole; and
 a venting pipe connecting the venting top interface to the venting outlet; and
a clean-in-place system comprising:
 a clean-in-place top interface connecting the clean-in-place system to the top of the tank;
 a clean-in-place inlet adapted to receive a tank-cleaning substance from a cleaning-substance source; and
 a clean-in-place pipe system connecting the clean-in-place top interface to the clean-in-place inlet;
wherein the manhole, the venting outlet and the inlet of the clean-in-place pipe system are housed in a lockable housing.

2. The tank trailer according to claim 1, wherein the clean-in-place pipe system comprises a control valve positioned proximate the manhole for controlling flow of the tank-cleaning substance between the clean-in-place inlet and the clean-in-place top interface.

3. The tank trailer according to claim 2, wherein the tank comprises a plurality of compartments, each compartment of the plurality of compartments comprising a corresponding one of said manhole, said venting system and said clean-in-place system, the clean-in-place systems of said plurality of compartments having a common clean-in-place inlet and being interconnectable to one another through said common clean-in-place inlet, and the clean-in-place systems of said plurality of compartments being isolatable from one another through operation of the corresponding control valves.

4. The tank trailer according to claim 3, wherein each clean-in-place system is further connected to the venting pipe of the venting system through a restrictor plate, the restrictor plate being removably disposed in a joint connecting the clean-in-place pipe system and the venting pipe.

5. The tank trailer according to claim 1, wherein the tank is substantially circular or elliptical and the lockable housing is positioned at about a 4 or 8 o'clock position when viewing the tank from the rear.

6. The tank trailer according to claim 1, wherein the manhole door comprises an alignment system for aligning the manhole door with the manhole during sealing.

7. The tank trailer according to claim 1, wherein the lockable housing comprises a bi-folded door.

8. The tank trailer according to claim 1, further comprising a tank fill detection system positioned in an interior top portion of the tank for detecting a level of filling of the interior of the tank.

9. The tank trailer according to claim 1, further comprising a tank empty detection system positioned in an interior bottom portion of the tank for detecting a level of emptying of the interior of the tank.

10. The tank trailer according to claim 1, further comprising a pressure gauge positioned within the lockable housing and connected to at least one of the venting system and the clean-in-place system, the pressure gauge indicating internal tank pressure.

11. The tank trailer according to claim 1, wherein the venting system further comprises an anti-wave system comprising:
an anti-wave pipe extending from the venting top interface into the tank; and
a plurality of holes provided on the anti-wave pipe opening towards the sides of the tank, wherein the plurality of holes are adjacent to the top of the tank.

12. The tank trailer according to claim 1, wherein the venting system further comprises a filter provided at the venting outlet.

13. A tank trailer comprising:
a tank comprising a plurality of compartments;
the tank trailer further comprising, for each of said compartments:
a sealable manhole positioned on a side of the tank proximate ground level;
a manhole door for sealing the manhole;
a sampler system provided on the manhole door;
a venting system comprising:
 a venting top interface connecting the venting system to a top of the tank;
 a venting outlet positioned proximate the manhole; and
 a venting pipe connecting the venting top interface to the venting outlet; and
a clean-in-place system comprising:
 a clean-in-place top interface connecting the clean-in-place system to the top of the tank;
 a clean-in-place inlet adapted to receive a tank-cleaning substance from a cleaning-substance source; and a clean-in-place pipe system connecting the clean-in-place top interface to the clean-in-place inlet;

wherein the manhole, the venting outlet and the inlet of the clean-in-place pipe system are housed in a lockable housing.

14. The tank trailer according to claim 13, wherein the clean-in-place systems of said plurality of compartments have a common clean-in-place inlet and are interconnectable to one another through said common clean-in-place inlet.

15. The tank trailer according to claim 14, wherein the clean-in-place pipe system of each compartment comprises a control valve positioned proximate the manhole for controlling flow of the tank-cleaning substance between the clean-in-place inlet and the clean-in-place top interface.

16. The tank trailer according to claim 15, wherein the clean-in-place systems of said plurality of compartments are isolatable from one another through operation of the corresponding control valves.

17. The tank trailer according to claim 15, wherein the restrictor plate is removably disposed in the joint.

18. A tank trailer comprising:
 a tank;
 a sealable manhole positioned on a side of the tank proximate ground level;
 a venting system comprising:
  a venting top interface connecting the venting system to a top of the tank;
  a venting outlet positioned proximate the manhole; and
  a venting pipe connecting the venting top interface to the venting outlet; and
 a clean-in-place system comprising:
  a clean-in-place top interface connecting the clean-in-place system to the top of the tank;
  a clean-in-place inlet adapted to receive a tank-cleaning substance from a cleaning-substance source; and
  a clean-in-place pipe system connecting the clean-in-place top interface to the clean-in-place inlet;

wherein the clean-in-place system is further connected to the venting pipe of the venting system through a restrictor plate, the restrictor plate being disposed in a joint connecting the clean-in-place pipe system and the venting pipe, and wherein the manhole, the venting outlet and the inlet of the clean-in-place pipe system are housed in a lockable housing.

19. A tank trailer comprising:
 a tank;
 a sealable manhole positioned on a side of the tank proximate ground level;
 a venting system comprising:
  a venting top interface connecting the venting system to a top of the tank;
  a venting outlet positioned proximate the manhole; and
  a venting pipe connecting the venting top interface to the venting outlet; and
 an anti-wave system comprising:
  an anti-wave pipe extending from the venting top interface into the tank; and
  a plurality of holes provided on the anti-wave pipe opening towards the sides of the tank, wherein the plurality of holes are adjacent to the top of the tank;
 a clean-in-place system comprising:
  a clean-in-place top interface connecting the clean-in-place system to the top of the tank;
  a clean-in-place inlet adapted to receive a tank-cleaning substance from a cleaning-substance source; and
  a clean-in-place pipe system connecting the clean-in-place top interface to the clean-in-place inlet;

wherein the manhole, the venting outlet and the inlet of the clean-in-place pipe system are housed in a lockable housing.

\* \* \* \* \*